United States Patent [19]

Urban et al.

[11] Patent Number: 4,476,968

[45] Date of Patent: Oct. 16, 1984

[54] EXPANDING SHOE DRUM BRAKE

[75] Inventors: John A. Urban, Plainwell; Peter L. Sherrick, Galesburg, both of Mich.

[73] Assignee: Eaton Corporation, Cleveland, Ohio

[21] Appl. No.: 561,141

[22] Filed: Dec. 14, 1983

Related U.S. Application Data

[63] Continuation of Ser. No. 314,621, Oct. 26, 1981, abandoned.

[51] Int. Cl.³ .............................................. F16D 51/22
[52] U.S. Cl. .................................... 188/329; 188/340; 188/341; 192/75
[58] Field of Search ............... 188/330, 335, 340, 341, 188/329, 328, 327; 192/75

[56] References Cited

U.S. PATENT DOCUMENTS

| | | | |
|---|---|---|---|
| 2,060,877 | 11/1936 | LaBrie | 188/340 X |
| 2,451,325 | 10/1948 | Eksergian et al. | 188/329 X |
| 3,081,844 | 3/1963 | Mathews et al. | 188/326 |
| 3,186,519 | 6/1965 | Johannesen | 188/340 |
| 3,497,037 | 2/1970 | Deibel | 188/326 |
| 3,795,292 | 3/1974 | Keller, Jr. | 188/340 |
| 3,941,218 | 3/1976 | Torii | 188/326 |
| 4,209,084 | 6/1980 | Peck | 188/250 D |

FOREIGN PATENT DOCUMENTS

| | | | |
|---|---|---|---|
| 157118 | 6/1954 | Australia | 188/340 |
| 546725 | 9/1957 | Canada | 188/341 |
| 1198947 | 6/1959 | France | 188/329 |

Primary Examiner—George E. A. Halvosa
Attorney, Agent, or Firm—C. H. Grace; H. D. Gordon

[57] ABSTRACT

An improved expanding shoe drum brake (10) is provided. The brake includes a pair of brake shoes (20) pivotably retained on an anchor structure (18). The shoes include brake tables (22) and webs (26), the webs are resiliently urged by a spring (132) into constant sliding engagement with three guide surfaces (78, 88 and 114) to locate the webs on a plane (P) relative to the spider and to retain a substantially parallel relationship between the shoe friction material (24) and the brake drum (12) thereby minimizing the required running clearance (44) or slack of the brake.

6 Claims, 11 Drawing Figures

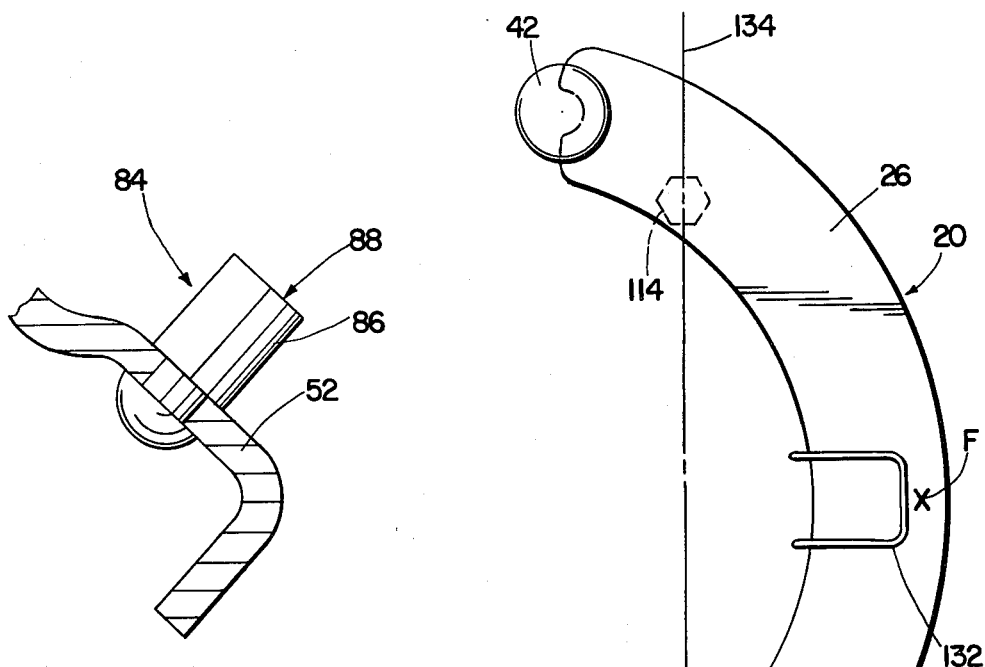
Fig. 7
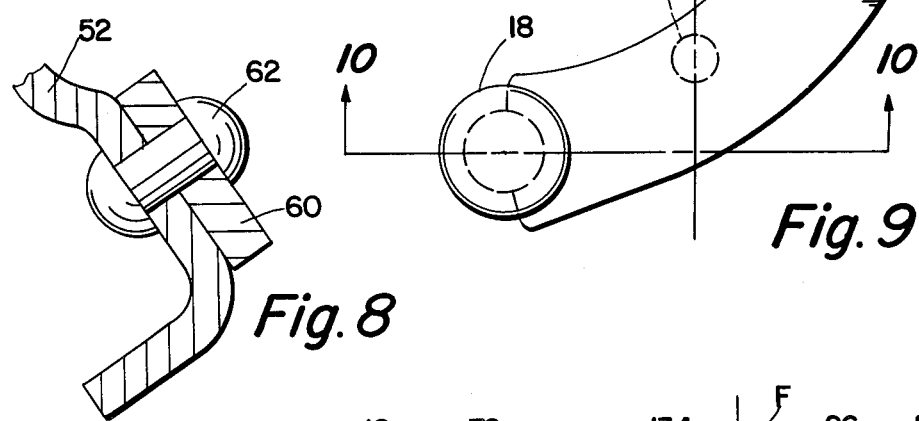
Fig. 8
Fig. 9
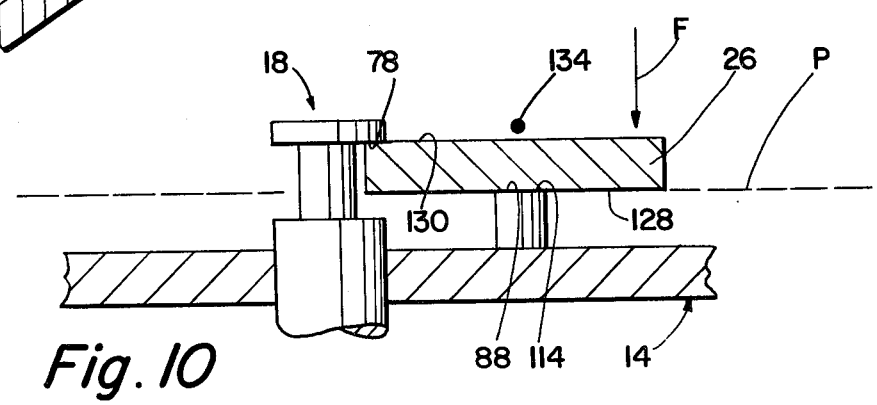
Fig. 10

EXPANDING SHOE DRUM BRAKE

This is a continuation of application Ser. No. 314,621, filed Oct. 26, 1981, now abandoned.

BACKGROUND OF THE INVENTION

1. Field of the Invention

The present invention relates to an expanding shoe drum brake and in particular to an expanding shoe drum brake of relatively light weight construction utilizing lift off type, single web brake shoes.

2. Description of the Prior Art

Expanding shoe drum brakes, especially air or hydraulically actuated drum brake systems wherein arcuate brake shoes nonrotatably secured to a portion of a wheeled vehicle are pivotably rotated about an anchor member or members into engagement with a rotating annular brake drum for the purposes of retarding the velocity of the wheeled vehicle by the use of a brake actuating member, such as a displaceable cam element, are well known in the art. The brake actuating member, usually a rotatable cam element or a linear wedge element, is located between the adjacent ends of the pivotal brake shoes and secured to a rotatable cam shaft or a linear actuation shaft, respectively, for translating oscilliatory, generally linear motion from a power source, such as an air motor or the like, to the brake shoes.

The actuating member, often in the form of a so called "S" cam or a wedge, is usually located between cam or wedge followers, often in the form of rollers or the like, rotatably fixed to the brake shoes.

Example of such prior art cam actuated drum brakes may be seen by reference to U.S. Pat. Nos. 3,497,037; 3,096,857 and 2,002,139 all of which are hereby incorporated by reference.

While the prior art cam and/or wedge actuated drum brakes, especially the "S" cam type drum brakes, are well received and accepted, such prior art devices were not totally satisfactory in certain situations as they usually were relatively heavy structures utilizing cast iron parts and multiple web brake shoes to attain the required strength and the required relative alignment between the parts thereof. The prior art has also included various attempts to produce relatively lighter weight cam actuated drum brakes by the utilization of relatively lighter weight stamped components. While many of these lighter weight brake assemblies have been highly satisfactory for certain applications and have been well commercially received, the prior art devices were not totally satisfactory for certain applications, such as for example, in use for a relatively smaller cam actuated drum brake for a front steer or drive steer axle. In particular, the prior art designs have been heavier and/or more complicated than is desired to achieve the required strength of the parts and/or to assure that the brake shoe is properly aligned with the brake drum, especially in the disengaged position of the brake. As is well known, maintaining proper brake shoe and brake drum alignment is desirable for reducing the required running clearance to a minimum and thus preserving the maximum of effective stroke of an air motor or the like. Many of the prior art lighter weight brake assemblies have utilized brake shoes having two or more webs and/or brake shoes having full apertures formed therein in which the anchor member or anchor pin was received in attempts to assure that the brake shoes of the drum brake remained properly aligned with the brake drums thereof.

SUMMARY OF THE INVENTION

In accordance with the present invention, the drawbacks of the prior art have been overcome to the extent than an improved drum brake, preferably a cam actuated drum brake, is provided having a relatively lightweight structure wherein the various components thereof are ridgedly attached and wherein the brake shoe web or webs are retained on a predetermined plane relative to the spider during radial expansion and retraction thereof thereby assuring that the brake shoe friction material remains substantially parallel (on a plane containing the axis of rotation of the drum) to the brake drum thus reducing the required minimum running clearance which must be maintained therebetween.

The above is accomplished by providing a brake shoe having preferably a single web which is pivotably received on an anchor member, preferably a single anchor pin, and is of the liftoff construction, that is the brake shoe is provided with a generally semi-arcuate concave cavity which is pivotably retained on the anchor pin and which may be easily lifted off therefrom for purposes of servicing of the brake. The webs of each of the brake shoes is maintained on the predetermined given plane relative to the brake spider by means of a three point locating system comprising two relatively widely spaced abutment surfaces engageable by one surface of the brake shoe web and a surface on the anchor member engaging the other surface of the brake shoe web. A spring retainer engages the brake shoe web at a point on the other surface thereof which is on the opposite side of a line drawn between the two abutment surfaces engaging the one surface thereof to cause the brake shoes to tend to pivot downwardly along the lines between the two abutment surfaces and upwardly into contact with the surface on the anchor member and to be thus resiliently urged into constant contact with said three points defining said planes. The brake is additionally provided with a stamped spider to which a cam shaft tube is mounted by a unique mounting system comprising three points surrounding said cam shaft in a generally triangular manner. Two of the attachment members comprise bolts having an axis substantially parallel to the axis of the cam shaft and the third point comprises a bolt received in a flange provided in the spider and extending substantially perpendicular to the axis of the cam shaft.

The spring retainer for applying a constant resilient force to the brake shoe webs to maintain said brake shoes in contact with said three locating points is preferably of a unique construction.

Accordingly, it is an object of the present invention to provide a new and improved expanding shoe drum brake of the type utilizing preferably single web brake shoes wheren the web is maintained on a given plane relative to the brake spider in both the applied and retracted positions of the brake shoe and is of the liftoff type construction.

This and other objects and advantages of the present invention will become apparent from a reading of the detailed description of the preferred embodiment taken in connection with the attached drawings.

BRIEF DESCRIPTION OF THE DRAWINGS

FIG. 7 is a partial view in section taken along substantially the line 7—7 in FIG. 5.

FIG. 8 is a partial view in section taken substantially along the line 8—8 in FIG. 5.

FIG. 9 is a top schematic view of the brake shoe alignment structure of the present invention.

FIG. 10 is a sectional view taken substantially along the line 10—10 in FIG. 9.

DESCRIPTION OF THE PREFERRED EMBODIMENT

Figure 1:
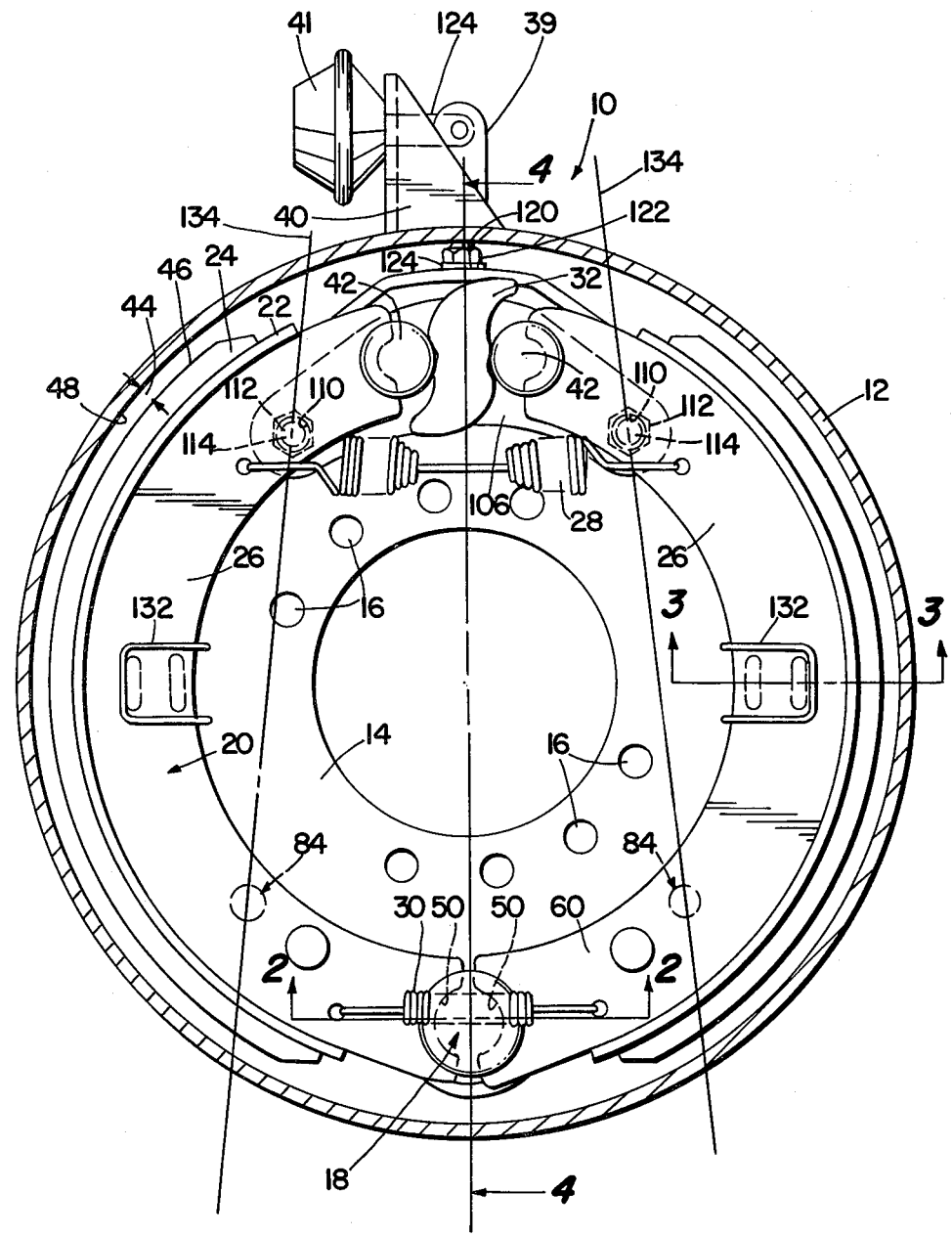
FIG. 1 is a front view of the expanding shoe drum brake of the present invention.
Figure 2:
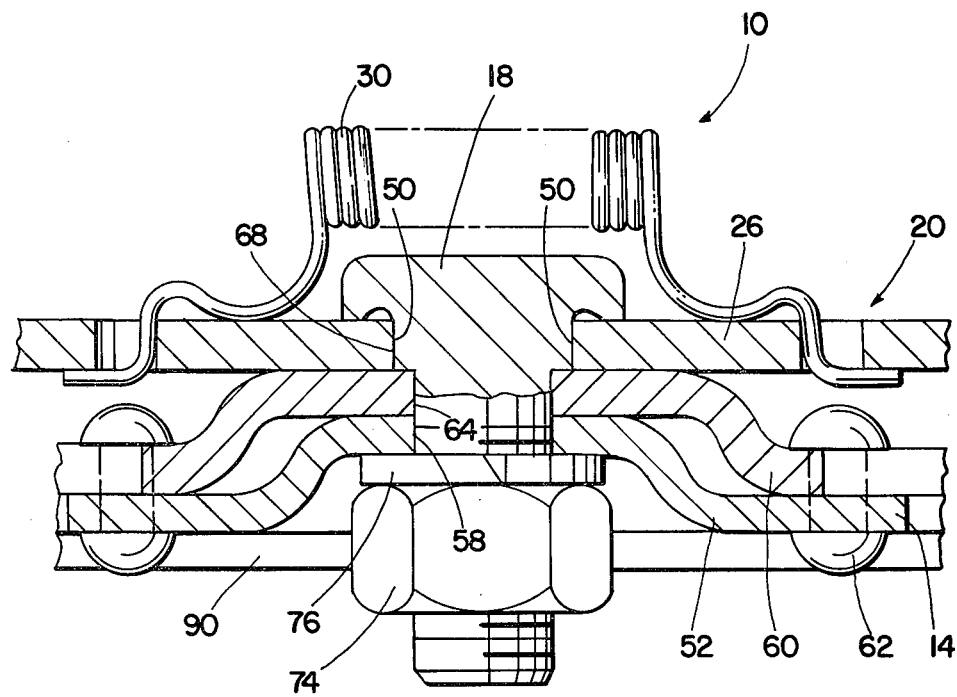
FIG. 2 is a sectional view taken substantially along the lines 2—2 in FIG. 1.

Certain terminology will be used in the following description for convenience in reference only and will not be limiting. The words "upwardly," "downwardly," "rightwardly," "leftwardly," "clockwise" and "counterclockwise" will designate directions in the drawings to which reference is made. The words "inwardly" and "outwardly" will refer to directions toward and away from, respectively, the geometric center of the device and designated parts thereof. The terms "inboard" and "outboard" will refer to directions toward and away from, respectively, the center of the vehicle to which the brake is mounted. Said terminology will include the words above specifically mentioned, derivatives thereof and words of similar import. The term "brake" as used herein is intended to include various frictional coupling devices such as clutches, brakes and the like.

In FIGS. 1-4 there is shown the expanding shoe drum brake assembly 10 of the present invention. For illustrative purposes only, the drum brake assembly 10 illustrated is of the "S" cam type utilizing a single anchor pin. It is understood, however, that the present invention is equally applicable to those expanding shoe drum brake assemblies utilizing other brake actuating means, such as wedge actuators and the like, and is also equally applicable to those drum brake assemblies utilizing other types of anchor structures, such as twin anchor pins or the like. Drum brake assembly 10 comprises a generally annular rotatable drum 12 (shown in section), a brake support member or spider 14 nonrotatably secured to portions of the vehicle by a plurality of suitable fasteners such as bolts (not shown) receivable through bolt circle holes 16, a brake shoe pivot or anchor pin 18 secured to the spider 14, a pair of opposed, generally arcuate, brake shoes 20 including a braking lining support or table 22 and a brake lining 24 of suitable friction material and webs 26, brake shoe return springs 28, brake shoe retention spring 30 and a cam element 32 for causing generally radially outwardly pivotal movement of the brake shoes 20 and brake linings 24 about the pivot or anchor pin 18 and into engagement with the brake drum 12 for braking movement of the vehicle in a known manner.

Also shown in FIGS. 1-4, is a cam shaft 34 to which the cam 32 is nonrotationally fixed or integral therewith. The cam shaft 34 is received within a cam shaft tube 36 which is fixed to the spider 14 in a manner to be discussed in more detail below. The rightward end 38 of the cam shaft 34 is provided with splines or the like for nonrotational receipt of a lever member 39 such as the lever body of an automatic or manual slack adjuster as is well known in the art. A brake actuator support bracket 40 is attached to the cam shaft tube 36 for receipt of a brake actuator 41 such as an air motor or the like. As is well known in the art, the oscilliatory motion of the actuator air motor is transmitted to the cam 32 by means of the lever body of the slack adjuster and the cam shaft 34.

Figure 4:
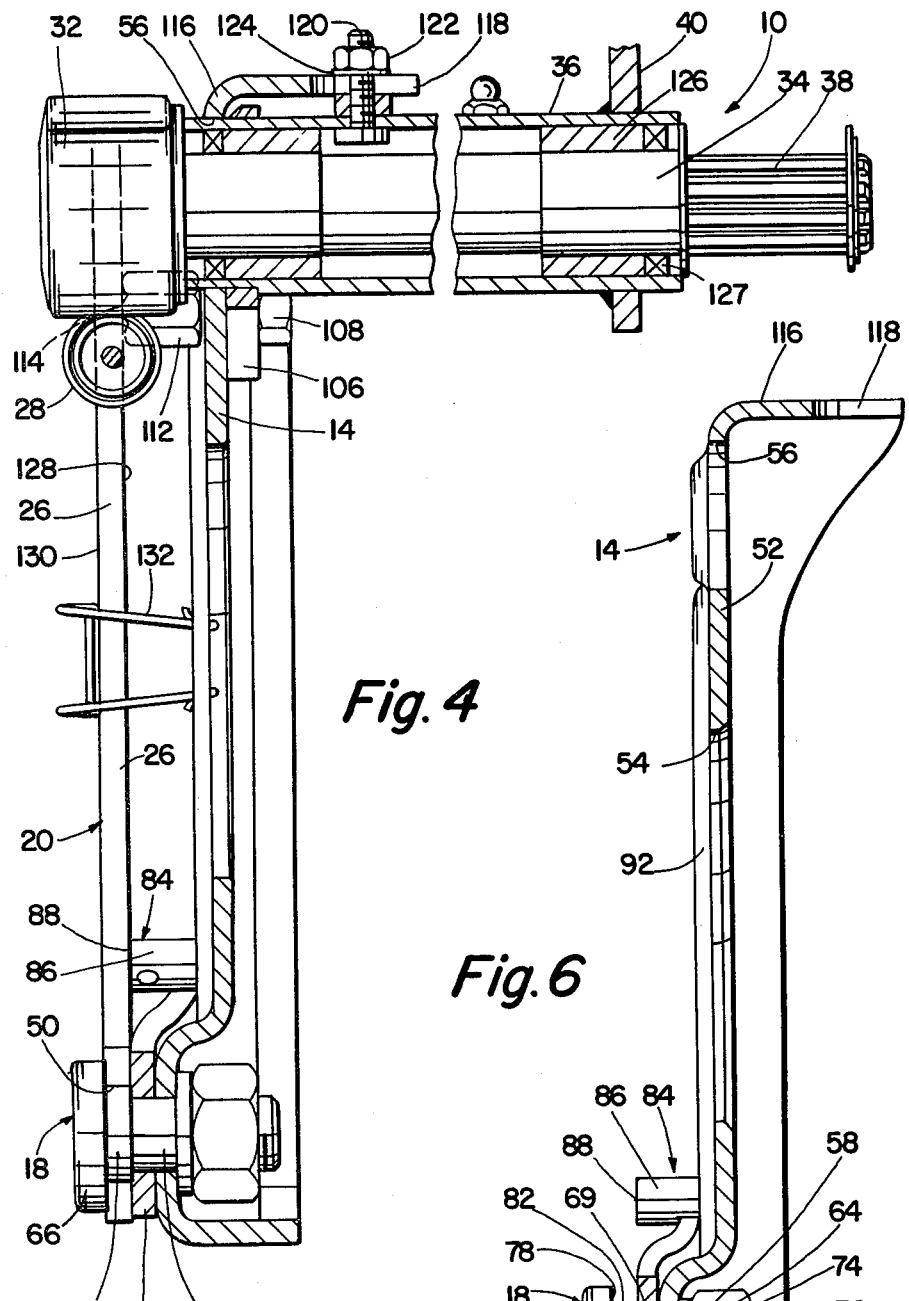
FIG. 4 is a side view substantially in section taken along substantially the lines 4—4 in FIG. 1.
Figure 6:
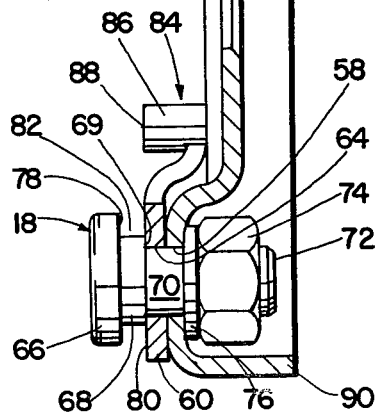
FIG. 6 is a side view partially in section of the spider assembly taken substantially along line 6—6 in FIG. 5.
Figure 5:
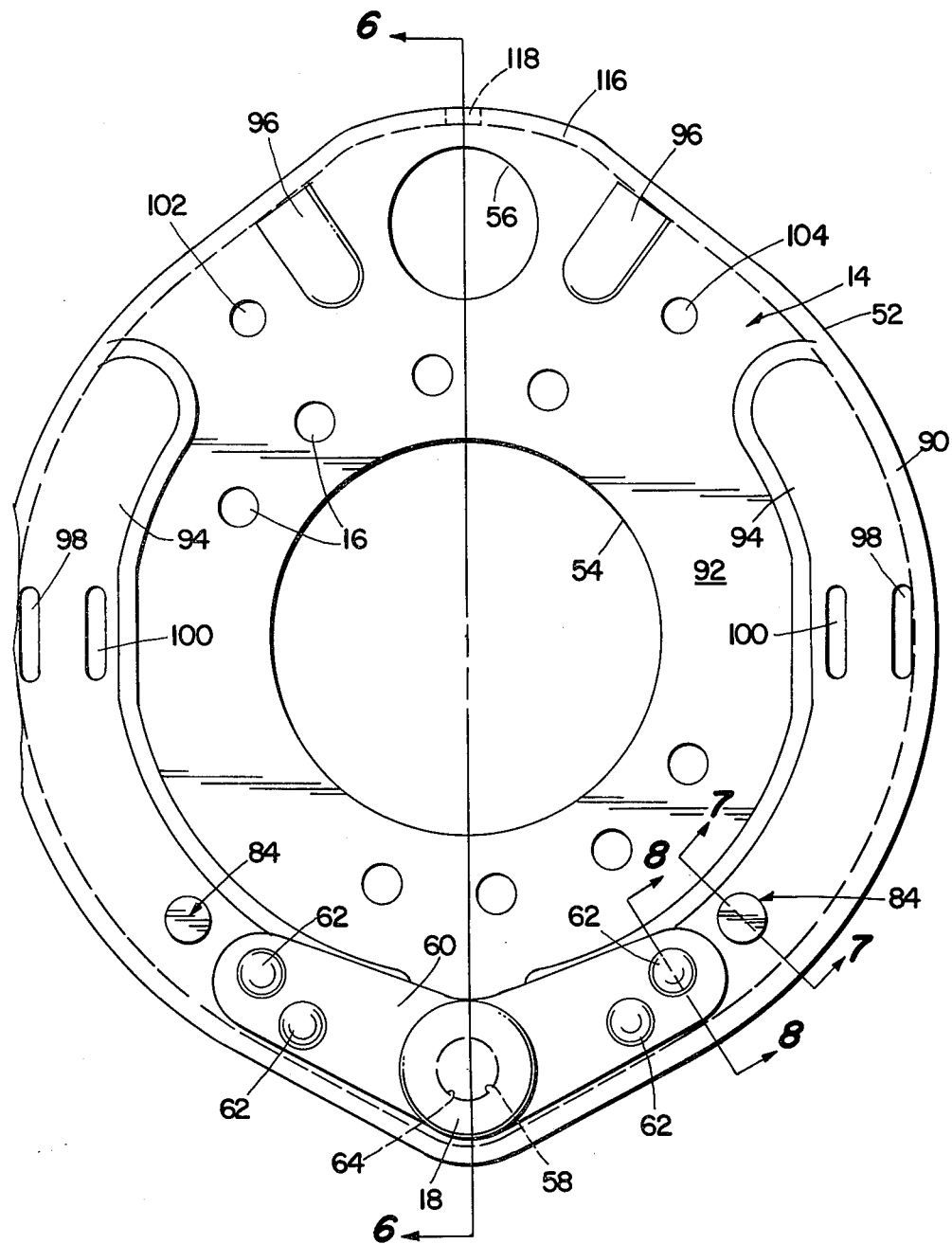
FIG. 5 is a front view of the spider assembly of the present invention.

For purposes of simplification of the illustration, the drum 12, slack adjuster 39, air motor 41, table 22 and friction material 24 are not shown in FIG. 4.

The general structure and operation of cam actuated expanding shoe drum brakes such as has been described briefly above is well known in the art and may be appreciated in further detail by reference to U.S. Pat. Nos. 3,497,037; 3,096,857 and 3,507,369, both of which are hereby incorporated by reference. Briefly, the brake assembly 10 illustrated in FIG. 1 is shown at the at rest or retracted position whereat the brakes are not applied. When it is desired to retard motion of the brake drum 12, usually fixedly attached to the wheels of a vehicle, the brakes are actuated by actuating an actuation member such as a well known air motor or the like which will cause a counterclockwise rotation of cam 32 as seen in FIG. 1. Cam followers 42 are preferably in the form of rollers which are rotationally mounted to the ends of the brake shoe webs 26 and caused to bear against the periphery of the working surfaces of the cam 32 by compression return springs 28 as is well known in the art. Counterclockwise rotation of cam 32 from the position illustrated in FIG. 1 will result in the cam followers 42 and the brake shoes being forced radially outwardly resulting in the generally arcuate brake shoes 20 pivoting radially outwardly about pivot point or brake anchor pin 18 sufficiently to cause brake friction material 24 to frictionally engage brake drums 12. A subsequent clockwise rotation of cam 32 will cause the brake shoes to pivot radially inwardly to the brake release position shown in FIG. 1.

Figure 3:
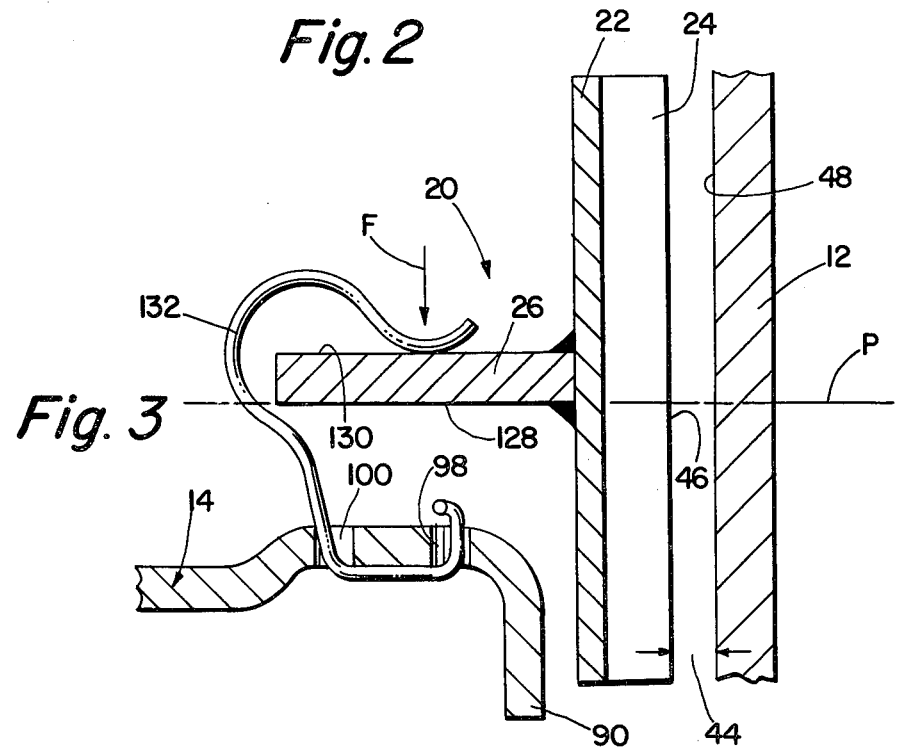
FIG. 3 is a sectional view taken substantially along the lines 3—3 in FIG. 1.

When the brakes are in the released position, such as is shown in FIGS. 1 and 3, it is important that a predetermined minimum radial clearance, or running clearance, 44, be maintained between the brake friction material 24 and the brake drums to prevent excessive wear, etc. It is desirable to maintain the running clearance, also called slack, at a minimum to conserve the effective stroke of the brake actuation air motor as is known in the art. For these reasons, it is important that the outer radial surface 46 of the brake friction material 24 be maintained as parallel (on a plane containing the axis of rotation of drum 12, see FIG. 3) as possible with the inner radial surface 48 of the brake drum 12. It is especially important to maintain this parallel relationship in the at rest position shown in FIGS. 1 and 3. In the applied position the brake drum friction material will tend to comform to the brake drum. If the brake friction material is not maintained parallel with the inner radial surface of the brake drum, it would be necessary to use a greater amount of the limited air motor stroke to assure that all portions of the brake shoe friction material 24 are at least the desired minimum running clearance from the inner radial surface of the brake drum. In the present invention, to maintain the radially outer surface 46 of the friction material 24 as close to parallel as possible with the inner radial surface 48 of the brake drum 12, the webs 26 of the brake shoes 20 are maintained on a predetermined plane, defined by three fixed points on the brake spider, relative to the brake spider in both the applied and released position of the brake shoes. As the webs 26 are usually perpendicular to the tables 22, the webs are usually maintained in a plane P parallel to a plane on the spider and perpendicular to the axis of rotation of the drum 12. It is especially important to positively maintain the predetermined relationship between the brake shoes and the brake spiders in a brake having a single web type of brake shoe as there is a greater tendency of the shoe to tilt about the anchor pin than is present in a brake equipped with two webs. It is also an important feature of the present invention to achieve the above relationship while maintaining the easy removal of the brake shoes for lining and relining purposes by providing a lift off type of brake shoe as will be described in greater detail below. As may be seen, the webs 26 of the brake shoes 20 are provided with a generally semi-annular concave cavity at the end thereof opposite the ends in which the rollers or cam followers are mounted. The concave cavities are pivotably received on the point or anchor members 18 and retained in engagement therewith by means of compression retaining springs 30 as is known in the art. Once the brake drum is removed from surrounding the brake shoes, the brake shoes may easily be removed from the spider-anchor pin assembly by simply removing the rollers and the return spring 28 and then pivoting the shoes out of contact with the anchor pin 18.

The spider assembly 14 and anchor pin 18 may be seen in greater detail by reference to FIGS. 5-8. The spider assembly 14 includes a stamped spider member 52 having a generally annular aperture 54 therethrough for receipt of an axle shaft or the like. Apertures 16 are provided on a bolt circle of a suitable pattern for attachment of the spider assembly to an axle housing or the like. At its upper end the spider stamping 52 has an aperture 56 therethrough for receipt of the cam shaft tube 36. At its lower end, spider stamping 52 has an aperture 58 therethrough for receipt of the anchor pin 18. A reinforcement plate 60 may be attached to the spider stamping 52 adjacent the opening 58 by means of rivets or other connectors 62 to provide additional strength at this point without requiring additional weight about the entire spider stamping. Reinforcement plate 60 has an aperture 64 generally coaxial with aperture 58 and the spider stamping through which the anchor pin 18 passes. Anchor pin 18 includes an enlarged headed portion 66, a first reduced diameter portion 68, having a larger diameter than the diameter of apertures 64 and 58, a second reduced diameter portion 70 having a diameter slightly greater than the diameters 64 and 58 for a press fit therein and a threaded portion 72 for receipt of a nut member 74. A washer 76 may be interposed the nut 74 and the adjacent surface of spider stamping 52. Washer 76 is preferably a lock washer as is shown. Anchor pin 18 is thus retained to the spider stamping 52 at a reinforced area defined by spider stamping 52 and reinforcement plate 60 by means both of the press fit between the anchor pin section 70 and the aperture 64 and 58 and by means of the tension of nut 74 drawing the shoulder 69 of anchor pin member 68 and section 70 into contact with the reinforcement plate 60. It may be seen that the shoulder 78 between the anchor pin headed portion 76 and reduced shaft portion 68 and the leftward or outboard surface 80 of the reinforcement plate 60 define a groove 82 for pivotal receipt of the arcuate cavities 50 of the spider shoe webs 26. Groove 82 is of an axial distance substantially equal to the axial thickness of the brake shoe web 26 at the arcuate groove 50 thereof.

A barrel shaped rivet 84 is attached to the spider stamping 52. Barrel shaped rivet 84 has an outboard barrel shaped portion 86 having a substantially flat guide or upper surface 88. Surfaces 88 and 78 are substantially perpendicular to the axis of aperture 54. Surface 88 is axially (i.e. along the axis of rotation of drum 12) spaced from shoulder 78 by a distance generally equal to the thickness of the web 26.

A rim 90 extends around the outer periphery of the spider stamping 52 and is bent at a substantially right angle to the face portion 92 of the stamping 52 to extend generally parallelly and inboardly with the axis of aperture 54. Rim 90 will provide additional strength and resistance to distortion for the stamping 52 as is well known in the art. Upraised portions or ribs 94 and 96 may be provided in the stamping 52 for additional strength as is well known in the stamping art. A pair of spaced slots 98 and 100 may be provided in the stamping 52 for purposes to be described in greater detail below. Apertures 102 and 104 are provided in the stamping 52 on either side of aperture 56 for purposes to be described in greater detail below.

Referring again to FIGS. 1-4, it may be seen that the cam shaft tube 36 is provided with a plate 106 welded thereto. Of course, plate 106 may be attached to cam shaft tube 36 in any known manner. Plate 106 is of a generally V-shaped construction somewhat similar to reinforcement plate 60 described below. A pair of bolts 108 extend through apertures 102 and 104 in the spider stamping 52 and complimentary apertures 110 provided in the plate 106 and received barrel nuts 112 on the outboard or lefthand side thereof as viewed in FIG. 4. Barrel nuts 112 are of an elongated construction and include a relatively flat upper surface 114 which is substantially parallel and on the same plane as surface 88 of barrel rivet 84. The upper portion 116 of rim 90 is provided with a slot 118 for receipt of the shank of a bolt 120 extending upwardly from cam shaft tube 36. Bolt 120 may pass through the upper periphery of cam shaft tube 36 as is illustrated or may be welded to the upper surface of cam shaft tube 36 as is known in the art. A nut member 122 and a washer 124 are threadably received on the upper end of the shank of nut 120. Washer 124 is of a greater radius than the width of slot 118. Accordingly, it may be seen that the cam shaft tube 36 is attached to the spider 14 at three spaced locations generally equally circumferentially spaced about the axis of the cam shaft 34. Two of the attachment means bolts 108 extend generally parallel to the cam shaft 34 and the third means bolt 120 extends generally perpendicular to the rotational axis of cam shaft 34. Various bushings 126 and seals 127 may be provided for support of cam shaft 34 in cam shaft tube 36.

The above mounting of cam tube 36 to spider 14 provides a relatively rigid three point mounting while not requiring a spider structure extending considerably radially outwardly beyond the cam shaft bore 56. This reduction in required radial dimension is especially significant in front steer and drive steer axles wherein space available for brakes is especially limited.

As may be seen, the web 26 of the brake shoe 20 is located on a plane relative to the spider 14 which is defined by three points, namely surfaces 88 and 114 both of which slidingly engage the inboard surface 128 of the web and shoulder 78 of the headed portion of anchor pin 18 which engages the outboard surface 130 of the web 26. As a radially outer surface 46 of the friction lining 24 is manufactured perpendicular to the web 26, by maintaining the web 26 generally perpendicular to the rotational axis of the drum, the radially outer surface 46 of friction lining 24 will be retained substantially parallel with the radially inner surface 48 of the drum 12. Of course, should the portions of web 26 contacting locating surfaces 78, 88 and/or 114 be axially offset from the positions illustrated, the contact surfaces will be correspondingly axially offset accordingly.

To assure that the web 26 is maintained in contact with the locating or guide surfaces 88, 114 and 78 when the brake is released, when the brake is moving towards engagement and when the brake is engaged, a retaining spring 132 is utilized to resiliently maintain the engagement of the web 26 with the three locating points or surfaces discussed above. Briefly, spring 132 is retained to the spider within slots 98 and 100 as may be seen by FIG. 3 and provides a constant resilient force on the outboard surface 130 of the web 26. As the spring 132 applies a resilient force F on web 26 in the inboard direction, or the rightward direction as seen in FIG. 4, at a point spaced radially outwardly from a line 134 drawn between locating points 114 and 88 the resilient force F of spring 132 will cause the web 26 to be forced rightwardly onto locating points or surfaces 114 and 88 to be maintained in sliding contact therewith and will also cause the web 26 to tend to pivot about line 134 and the radially inwardly portion thereof and be forced outwardly, or leftwardly as seen in FIG. 4, to be maintained in contact with locating surface 78. Thus, by means of the resilient biasing spring 132 and the placement of locating surfaces 114, 88 and 78, the web is constantly resilient urged to be maintained in its desired plane during the brake applying operation as well as when the brake is released. Such locating, schematically illustrated in FIGS. 9 and 10, is provided in a positive resiliently biased manner and with the utilization of relatively simple and lightweight components.

Figure 11:
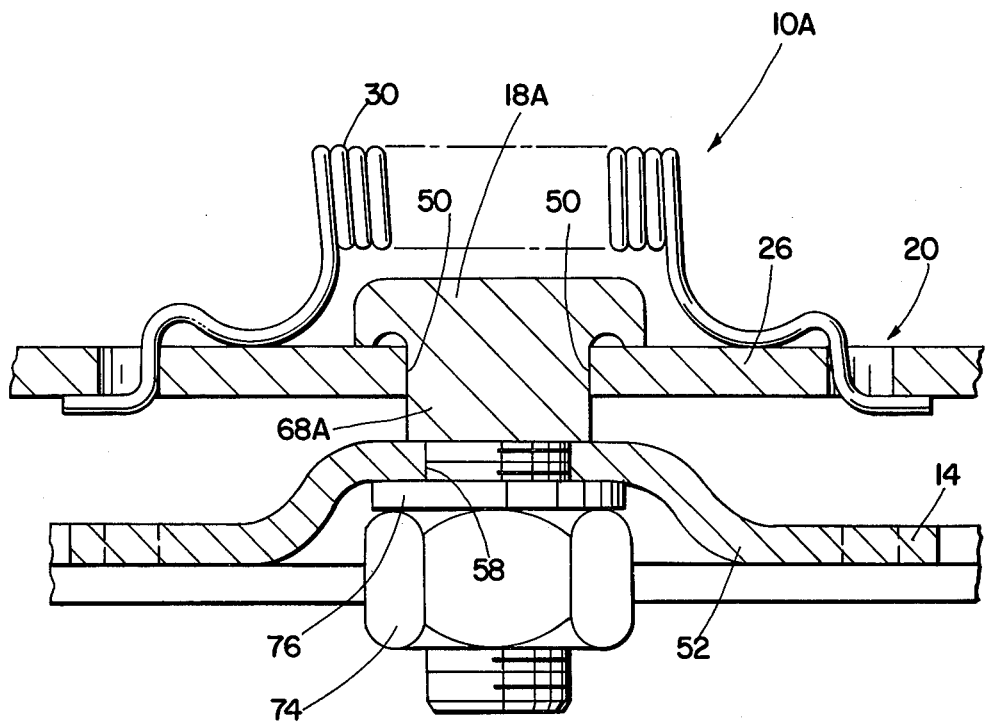
FIG. 11 is a view similar to FIG. 2 of an alternate embodiment of the present invention.

An alternate embodiment 10A of the present invention may be seen by reference to FIG. 11. Embodiment 10A is similar to embodiment 10 described above except that it is a lighter weight, lower cost structure intended for lighter duty applications. As may be seen, the reinforcement plate 60 and the rivets 62 utilized in embodiment 10 have been eliminated. Additionally, for ease of location, an alternate modified anchor pin 18A having an elongated first reduced diameter portion 68A is preferably utilized in place of anchor pin 18. Except for the utilization of the modified anchor pin 18A, and the elimination of plate 60 and rivets 62, the structure and function of embodiments 10A and 10 are identical. This modification, 10A, using identical parts as embodiment 10, except for anchor pin 18A, is possible as location of shoe web 26 relative to spider 14 does not depend upon the plate 60.

It may be seen from the above, that a relatively lightweight expanding shoe drum brake is provided which is relatively simple in construction and which will resiliently, positively maintain the parallelism of the radially outer surfaces of the shoe friction materials and the radially inner surface of the brake drum.

Although this invention has been described in its preferred embodiment with a certain degree of particularity, it is understood such description is by way of example only and that certain modifications are possible within the spirit and the scope of the invention as hereinafter claimed.

We claim:

1. An improved cam actuated expanding shoe drum brake comprising:

a spider member;

a selectively displaceable brake actuation means fixed to said spider member, said actuation means comprising a rotatable cam, a pivot structure comprising a single anchor pin having a headed portion and a shank portion fixed to said spider member;

a pair of generally arcuate radially outwardly movable brake shoes pivotably supported on said pivot structure, each of said brake shoes carrying a cam follower member at one end thereof engaged by said actuation cam for movement therewith, said actuation cam having a first position for allowing said shoes to be radially retracted and a second position for causing said shoes to be radially expanded;

each of said brake shoes comprising a web structure comprising at least one web, said web structure defining a first and a second generally parallel opposed surfaces, and a table structure generally perpendicular to said web structure and carrying friction material on the radially outer surface thereof, each of said webs provided with a generally semiarcuate cavity at the other end thereof pivotably retained on the shank portion of said anchor pin;

the improvement comprising means to locate said web structure on a predetermined plane relative to said spider in both the radially retracted and radially expanded positions thereof, said locating means comprising:

first and second spaced generally flat guide surfaces fixed to said spider and directly slidably engageable with said first surface of said web structure, a fixed third generally flat guide surface defined by the shoulder between the headed and shank portions of said anchor pin, said third guide surface spaced from and parallel to said first and second guide surfaces, said third guide surface axially spaced from said first and second guide surfaces by a distance generally equal to spacing between said first and second surfaces on said web structure and directly slidably engageable with said second surface on said web structure, said third guide surface not being on a straight line drawn from said first to said second guide surface, and means resiliently engaging said second surface of said web structure and applying a resilient force on said web structure in the direction toward the first surface thereof, said resilient means engaging said second surface on the opposite side of said line drawn from said first to said second guide surface as said third guide surface and comprising with said guide surfaces the only guide means for said brake shoes whereby said web structure will be constantly resiliently urged into sliding engagement with said first, second and third guide surfaces.

2. The improved brake of claim 1, wherein said anchor pin additionally comprises a reduced diameter shank portion extending though and received in a press fit in a bore in said spider, a threaded portion extending from said spider in the opposite direction from said headed portion, and a nut threadably received on said threaded portion for applying a compressive force on the spider and the shoulder defined between the shank portion and reduced diameter portion of said anchor pin.

3. The improved brake of claim 1, wherein said web structure comprises a single web, said first surface of said web comprises the inboard surface of said web and the second surface of said web comprises the outboard surface of said web.

4. The improved brake of claim 3, wherein said first guide surface is the flat head of a fastener secured to said spider adjacent said actuation means and said second guide surface is the flat head of a fastener secured to said spider at a point circumferentially interposed said first and third guide surfaces.

5. The improved brake of claim 4, wherein said resilient urging means is a spring carried by said spider at a point circumferentially interposed said first and second guide surfaces.

6. The improved brake of claim 3, wherein a generally annular rotatable drum surrounds said friction material, said drum having a generally annular radially inner surface generally parallel on a plane containing the axis of rotation of said drum with said friction material, said first, second and third guide surfaces being generally perpendicular to the rotational axis of said drum.

* * * * *